United States Patent

Freeland

[11] 3,730,068
[45] May 1, 1973

[54] MOTOR DRIVEN CAMERA FOCUSING MECHANISM
[75] Inventor: Stanley R. Freeland, Glenview, Ill.
[73] Assignee: Bell & Howell Company, Chicago, Ill.
[22] Filed: Sept. 13, 1971
[21] Appl. No.: 179,862

[52] U.S. Cl. ..................95/44 R, 95/45, 352/140
[51] Int. Cl. ..............................................G03b 3/00
[58] Field of Search ..................95/44 C, 44 R, 45; 352/140

[56] References Cited

UNITED STATES PATENTS

| | | | |
|---|---|---|---|
| 3,538,831 | 11/1970 | Mueller | 95/44 C |
| 3,538,833 | 11/1970 | Koeber | 95/44 C |
| 3,572,230 | 3/1971 | Freeland | 95/44 C |

Primary Examiner—Samuel S. Matthews
Assistant Examiner—Michael D. Harris
Attorney—John E. Peele, Jr. et al.

[57] ABSTRACT

An electrically conductive pendulous member is mounted on a camera for operation in response to the principle of triangulation and for selective positive displacement into any operative condition by a manually actuatable control mechanism. Upon displacement of the pendulous member into engagement with a conductive portion of a carrier means, a motor of a lens focusing mechanism is energized to cause simultaneous adjustment of the lens and the carrier means until the lens is in an "in-focus" condition. A secondary indicator circuit informs the user when a focusing operating is complete.

15 Claims, 4 Drawing Figures

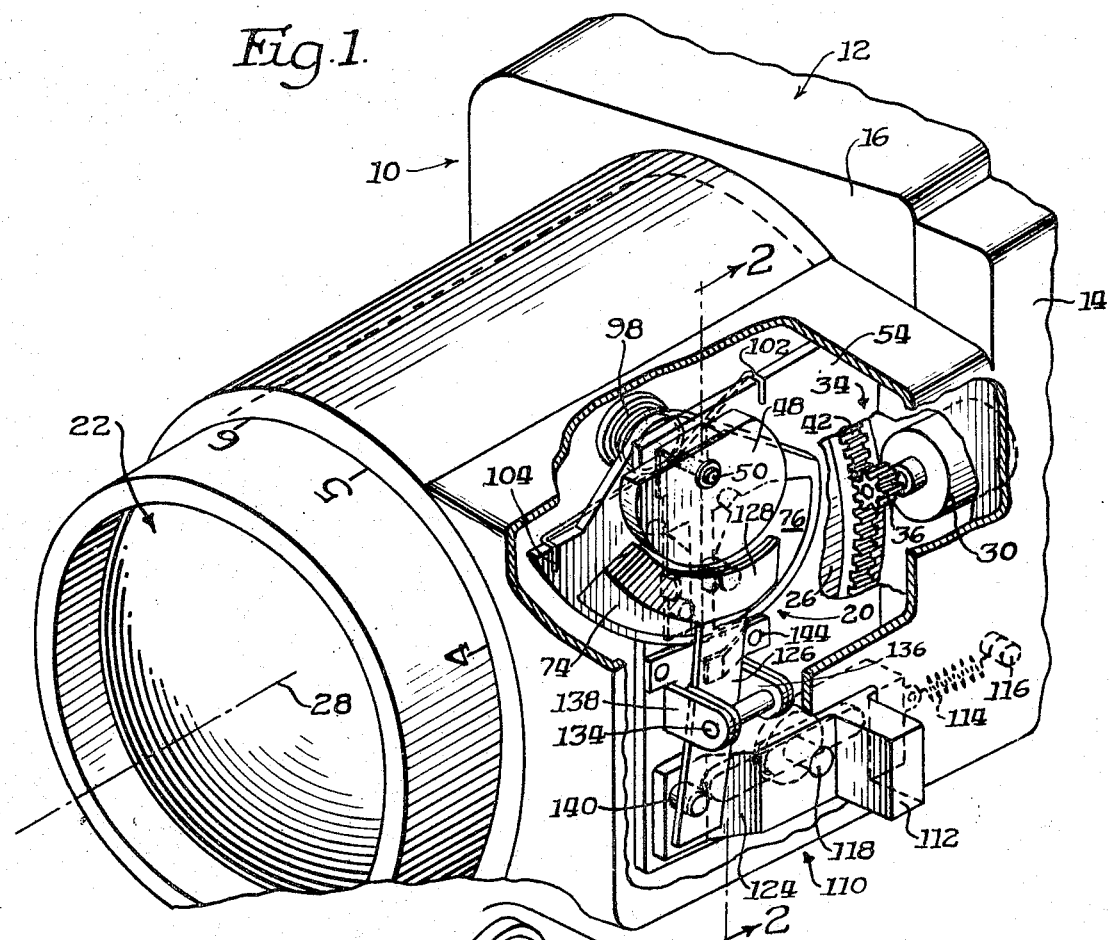

MOTOR DRIVEN CAMERA FOCUSING MECHANISM

The present invention relates to a camera focusing mechanism, and particularly, to a mechanism functioning on the principle of triangulation for adjusting a focusable lens of a camera in response to focal distances determined by the mechanism. The lens is adjusted responsive to the orientation of a gravity influenced member by a motor energized through control circuitry.

The triangulation principle relates to the determination of the length of one side of a right triangle, herein corresponding to a base line along which the camera-to-subject distance is measured. To compute the distance, the height of either the vertical side or the length of the hypotenuse of the triangle, and one of the angles other than the right angle must be known. For use of the principle in a camera focusing arrangement, the length of the vertical side of the triangle may be empirically determined as the "eye level height of an average adult user" above the supporting plane or base line on which the user stands. Upon alignment of the base of a remote subject with a reference mark in the viewfinder of the camera, the camera is caused to be angled by determinable amounts. That is, the user views the subject at the point where a vertical line through the subject intersects the supporting plane causing the optical axis of the camera's lens to be oriented at a given angle relative to both the vertical side and the base line of the triangle. Hence, the required mathematical values necessary to compute the unknown length of the base line are available.

The present invention seeks to eliminate the need for mathematical computation by the user by providing a mechanism which functions to focus the lens on a semiautomatic basis. To determine the angle of inclination of the optical axis, a pendulous member, oriented under the influence of gravity, is arranged to pivot about an axle which extends perpendicularly of the optical axis. When the user sights the base of a subject at infinity, the optical axis remains substantially parallel with a base line on which both the subject and the user are effectively supported. Hence, the pendulous member remains substantially perpendicular to the horizontally oriented optical axis. However, if the user sights the base of a near subject, the optical axis and camera housing will be inclined relative to the horizontal base line. As the housing is inclined, the pendulous member, if free, will remain fixed in space continuing to hang vertically under the influence of gravity, and will be displaced from the optical axis by a given angle. Since the range of angular displacements corresponding to the range of focus planes of the lens can be determined, these values may be built into a focusing mechanism to adjust the focus of the lens for that given distance.

Translation of the angular orientation of a pendulous member to focus distance for adjustment of the focus plane of a lens may be accomplished through mechanical and electromechanical mechanisms. Typical mechanisms found to be advantageous in the latter category are described in the U. S. Pat. Nos. 3,538,830 and 3,538,831, assigned to the assignee of the present application. While the achievement of these mechanisms is satisfactory, the present invention describes an improvement for effecting the desired results in a yet more desirable manner.

The features of the invention for effecting the improvements in the electromechanical distance determining mechanisms include a gravity oriented member arranged for movement relative to the housing of a camera or other optical instrument having a focusable objective lens assembly. The gravity oriented member, typically a pendulum, is displaceable positively between a free position in which it can be oriented at an angle relative to the optical axis of the lens, and a focusing mode position. For movement to the latter position, a manually actuatable control member is arranged to engage the pendulum for displacement without arcuate movement into contact with a conductor carrier. The pendulum is in an electrical circuit with a lens adjusting motor which is reversibly energizeable through at least two conductor plates on the carrier, when the pendulum is in contact therewith. Upon energizing of the motor, the lens and the carrier are driven until the circuit is de-energized as the conductor plate is moved relative to the conductive pendulum for disengagement. At this orientation, a signal device informs the user that lens focus has been achieved.

An object of the present invention is to provide a novel and improved powered focusing mechanism for a camera having a focusable objective lens.

Another object is to provide a camera with a powered focusing mechanism having a positive acting actuator to selectively energize the focusing mechanism.

Further and other objects will be apparent from the description of the accompanying drawings in which like numerals refer to like parts.

IN THE DRAWINGS

FIG. 1 is a perspective view of an optical instrument incorporating the mechanism of the present invention with parts broken away and parts removed for clarity;

FIG. 2 is a sectional view taken along section line 2—2 of FIG. 1;

FIG. 3 is an exploded perspective view of certain components of the focusing mechanism of the present invention; and FIG. 4 is a schematic diagram of the circuitry associated with the focusing mechanism.

Referring now more particularly to the drawings, there is shown a portion of an optical instrument, such as a camera 10, having a housing 12 including at least one side wall 14 and a front wall 16. The housing encloses a viewfinder system (not shown) having a reference mark relative to which the base of a viewed subject may be aligned. A distance determining or focusing mechanism 20 is enclosed within housing 12 for adjustment of the focus condition of a focusable objective lens 22 mounted to the front wall 16 of the housing 12. Focusing of the objective lens is accomplished by movement of a focusing lens element or cell, shown typically in FIG. 2 as element 24.

A change of the distance between the camera and the subject changes the plane on which the image formed by the objective lens 22 is focused. Thus, to enable adjusting the focal plane on which an image is focused into coincidence with the generally fixed film plane of the camera, the objective lens 22 is capable of being focused for a range of camera-to-subject distances. The distance determining mechanism 20 is coupled with the objective lens 22 to control translation of the lens barrel 26. As the barrel is rotatably translated, the focusing cell 24 moves axially of optical axis 28 defined by the objective lens to a position wherein a focus condition of the lens corresponds to the camera-to-subject distance determined by the focusing mechanism.

To adjust the focus of the objective lens 22, a drive means, shown schematically in FIGS. 1 and 4 as a small reversible DC motor 30, is supported within the camera housing 12. A drive transmission 34, indicated schematically in FIG. 4, couples the motor to a drivable component of either the focusing mechanism or the lens assembly. As shown in FIG. 1, the transmission may include a pinion 36, fixed to a drive shaft of the motor, and arranged for drivably engaging a gear 42 about the lens barrel 26. By selective completion of circuitry as the focusing mechanism 20 reacts when in a focusing mode but a non-focused condition, the motor 30 is energized by a power source, shown as a battery pack 44. Motor operation drives gear 42 to cause translation of focusing lens cell 24 axially along optical axis 28 until a focus condition is attained by the focusing mechanism. The focusing mechanism 20 includes a gravity oriented, pendulous member 48 which is supported for free swinging movement about an axle which is one diameter of a multi-diameter threaded shaft member 50 combining an assembly screw spacer and the support axle. Another diameter of this shaft member is threaded into a mechanism support plate 54 within the camera housing 12. Rotation of the camera housing, as occurs upon sighting the base of a remote subject, causes the pendulous member 48 to be continuously oriented into a vertical position under the influence of gravity. Fixed on the pendulous member for movement therewith is a yieldable and electrically conductive contact plate 56 having a ledge portion 58 which extends over a complementary shaped ledge portion 60 of the pendulous member. A pair of tabs 64 extend from opposite edges of the contact plate. A conductive pin 68 is fixed to the contact plate 56 in a position spaced from the axis about which the pendulum swings so as to establish an arcuate path in accordance with the swinging movement.

Adjacent the inner face of the pendulous member 48 and mounted for rotation about a bearing diameter of the threaded shaft 50 is a conductor support plate or carrier 70. The conductor carrier, preferably formed of electrically nonconductive material, is provided with a shaft receiver, shown as cut-out 72. A pair of spaced conductor sheets 74, 76 are mounted on the surface of the carrier facing the pendulous member and preferably are recessed to be flush with that surface. Conductive rivets 78 are attached to each sheet and pass through the carrier to connect the respective conductor sheets in the circuitry shown schematically in FIG. 4. On the carrier between the adjacent edges of the conductor sheets, a surface portion or flat 82 is formed having a width slightly greater than the diameter of the conductive pin 68 of the pendulous member 48. A pin receiver, shown as a detent 84 in the flat of the carrier, is arranged in the arcuate path of movement of the pin to entrap same and positively prevent further relative movement between these components.

Also attached to the carrier is a secondary conductor 88 having a portion thereof aligned with the pin receiver 84. The secondary conductor is connected to an indicator circuit, shown schematically in FIG. 4, including a power source 90, and an indicator, shown as a lamp 92, which when energized might be visible in the not shown viewfinder of the camera. Assuming the focus mechanism to be in focusing mode and to have reached a focus condition, the pin 68 of the pendulous member 48 energizes the indicator lamp upon passing through the pin receiver and making contact with the secondary conductor 88.

As shown in FIG. 2, a cam follower lug 94 extends from the rear surface of the carrier 70 to engage in a cam track 96 formed about the focus barrel 26 of the objective lens 22. Rotation of the focus barrel by the motor 30 causes simultaneous axial displacement of the lens focus cell 24 and tracking of the cam follower lug 94. As the axially varying cam track moves relative to the follower lug 94, the carrier 70 is caused to pivot about the axis through shaft 50. A resilient means shown as a coiled spring 98, has its core about the shaft 50, with one end 102 against the mechanism support plate 54, and a second end 104 engaging and continuously urging the carrier in one direction such that the cam follower lug 94 is maintained against one edge of cam track 96.

An actuating mechanism 110 is provided within the camera housing to control the operation of the focusing mechanism 20. A control button 112 extends externally of the housing 12 for manual actuation between an operative or focusing mode position and an inoperative position. In this preferred embodiment, a biasing member, shown as spring 114, is connected between a post 116 fixed in the housing, and the control button. The spring 114 biases the slidably supported button 112 toward the inoperative position, yet yieldably permits actuation of the button to the operative position. Integral with the external button portion is an internal body portion shown as a spacing stud 118 attached to the mechanism support plate for supporting the button within the housing for guided sliding movement. On an externally directed surface of the body member of the control button is formed a wedge-like camming surface 124 connecting two levels of the body portion.

Additional to the control button, the actuating mechanism 110 comprises a shifter assembly 126 which functions relative to the pendulous member 48 as a displacing means and lock. The shifter assembly includes a pendulous member contact portion 128, faced with a pad of resilient material 130, which enables effectively positive engagement of the tabs 64 of the pendulous member by slight depression of the tabs into the pad. When so engaged, the pendulous member cannot be inadvertently displaced about the axle portion of the shaft 50 on which it is supported. That is, the pendulous member functions as an orientation position storage member for programming the circuitry through the conductor carrier, and will be held against rotation while the carrier 70 is drivably adjusted to an orientation in agreement with focus condition of the objective lens. Upon initial engagement of the shifter member onto tabs 64, the pendulous member 48 is displaced axially on the shaft 50 so that the conductive pin 68 will engage either one of the conductor sheets 74, 76 of the carrier or the flat 82 therebetween. The axial displacement of the pendulous member is effected by pivoting of the shifter member about a pivot axle 134 passing through a pair of aligned wing portions 136 bent from the elongated body of the shifter. The pivot axle is mounted in axle support portions 138 which are fixed to the mechanism support plate 54. These support portions permit the shifter portion to rotate about the axle without lateral shifting and or angular pivoting relative to the axle, which latter movements might cause inaccurate translation of the position of the pendulous member relative to the conductor carrier.

Actuation of the shifter member 126 is translated from the control button 112 by a rider button 140 fixed to the end of the shifter opposite the pendulous member engaging end. The rider button is positioned in a path along which control button 112 is shiftable. When the control button is at the inoperative position under the biasing of spring 114, the rider button 140 engages the lower level of the control button relative to camming surface 124. Upon actuation of the control button 112, the rider button of the shifter is effectively displaced by the wedge-like camming surface until the rider rides on the upper level of the control button surface. This shifting action of the camming portion pivots the opposite end of the shifter into engagement with the pendulous member until focusing is complete.

After a focusing operation, and upon release of the control button 112, a small leaf spring 144, attached to the mechanism support plate 54, urges the shifter toward pendulum released orientation. That is, release of the control button 112 permits retraction of the shifter 128 by the spring 114 and enables the rider button 140 to effectively descend on the wedge in response to the leaf spring 144. As the shifter is withdrawn from the pendulous member 48, the circuits are interrupted until the next focusing operation.

Referring to FIG. 4, the schematic circuit of the electrical arrangement is shown wherein the motor 30 is arranged to be energized when the conductive pendulous member 48 engages either of the conductor sheets 74 or 76. Since the battery pack 44 is center tapped, current flow in the control circuit is reversed depending upon which of the respective conductor sheets is engaged. Thus, the circuit through the respective sheets causes the motor to drivably rotate the lens toward its "in focus" condition and to rotate toward the flat 82 between the sheets. Rotation of the carrier in either direction stops when the motor 30 is deenergized as the pin 68 moves from the conductor sheet onto the flat 82 of the carrier, and into the receiver 84 formed in the flat. Completion of the circuit through the secondary conductor 88 causes energization of the indicator signal 92, which indicates that the distance determining mechanism is centered, and the focusing operation is complete. After the user is appraised that the lens is focused on the subject, the shifter is released thereby causing release of the pendulous member.

Alternatively, a circuit to the indicator may be arranged through the conductor plates so as to actuate the signal until the lens reaches the focus condition.

Additionally, a locking switch such as a detented slide control or a toggle actuated cam control may be substituted for the slidable control button of the actuator mechanism. Actuation of this lockable control to a first position causes actuation of the pendulous member restraining shifter into the focusing mode. The control can then be released by the user and would remain in the first or actuation position. Although the control may be reset immediately after focusing is complete, it need not be reset until another focusing operation is to be initiated. The latter operation requires that the switch be returned to the second position for a period to permit the pendulous member to acquire an adjusted position before the shifter member is again moved to a pendulous member restraining position by return of the control to the first position.

What is claimed is:

1. In combination in a camera including a motor driven focusable objective lens,
    circuit means for controlling energization of the motor,
    camera-to-subject distance determining means responsive to angular orientation of said lens relative to the base of the subject, said distance determining means including orientation position storage means for programming said circuit means,
    manually actuatable means for positively actuating said storage means for energizing of said circuit means, and
    means being positionable responsive to the focus condition of said lens and being cooperable with said storage means for de-energizing said circuit means upon adjustment of said lens to focus condition by said motor.

2. The combination as in claim 1 wherein said circuit means includes spaced conductor portions for reversibly energizing said motor.

3. The combination as in claim 2 wherein said storage means includes gravity responsive means.

4. The combination as in claim 3 wherein said gravity responsive means is a pendulous member supported about an axle for swinging movement.

5. The combination as in claim 3 wherein said gravity responsive means includes a conductive portion movable into engagement with said conductor portions of said circuit means for selective energization of said motor means.

6. The combination as in claim 3 wherein said actuatable means includes a slidable member having a wedge portion for shifting said gravity responsive means between a free swinging position and a restrained position.

7. The combination as in claim 6 wherein said actuatable means further includes a resilient surface to prevent rotational movement of said gravity responsive means upon and during energization of said circuit means.

8. The combination as in claim 6 including a carrier and a cam follower cooperating with a cam track about said lens for positioning said carrier responsive to adjustment of focus condition of said lens, said carrier supporting said spaced conductor portions and said means for de-energizing said circuit means.

9. The combination as in claim 8 wherein said carrier includes detent means cooperating with said de-energizing means for maintaining said gravity responsive means in orientation with said conductor carrier wherein said lens is in focus condition.

10. The combination as in claim 8 wherein said actuatable means positively displaces said gravity responsive means into a restrained position in engagement with said conductor carrier for energizing said circuit.

11. The combination as in claim 10 wherein said circuit means includes signal means indicating agreement of the orientation of said gravity responsive means and the focus condition of said lens.

12. The combination as in claim 11 wherein said signal means includes further conductor means energized upon relative positioning of said gravity responsive means between said spaced conductors on said carrier.

13. In combination in a camera including a focusable objective lens defining an optical axis and motor means for adjusting focus condition of the lens,
   circuit means for controlling energization of said motor means including spaced conductors supported on a carrier adjustable responsive to focus condition of said lens,
   distance determining means responsive to angular orientation of said optical axis relative to the base of a remote subject including a pendulous member arranged for positioning responsive to gravity when in a free swinging mode,
   manually actuatable means for positively displacing said pendulous member from said free swinging mode to a circuit energizing mode in movement restrained engagement with said carrier, and
   means on said carrier operable responsive to the relative positions of said carrier and said pendulous member for de-energizing said circuit means upon adjustment of said lens into focus condition corresponding to the position of said pendulous member.

14. The combination as in claim 13 wherein said pendulous member includes a conductive portion movable into engagement with said conductor portions of said circuit means for selective energization of said motor means.

15. The combination as in claim 13 wherein said carrier includes detent means cooperating with said de-energizing means for maintaining said pendulous member in orientation with said conductor carrier wherein said lens is in focus condition.

* * * * *